United States Patent [19]
Koda

[11] Patent Number: 5,022,449
[45] Date of Patent: Jun. 11, 1991

[54] NONSKID DEVICE FOR AUTOMOBILE TIRES HAVING ANNULAR ELASTIC BUFFER MEMBERS

[76] Inventor: Masuo Koda, 5-1, Imaizumidai, 6-chome, Kamakura-shi, Kanagawa, Japan, 247

[21] Appl. No.: 481,763

[22] Filed: Feb. 16, 1990

Related U.S. Application Data

[63] Continuation-in-part of Ser. No. 265,801, filed as PCT JP88/00102 on Feb. 4, 1988, published as WO88/06105 on Aug. 25, 1988, abandoned.

[30] Foreign Application Priority Data

Feb. 10, 1987 [JP] Japan .................................. 62-17199

[51] Int. Cl.⁵ ........................ B60C 27/20; B60C 27/08
[52] U.S. Cl. .................................. 152/226; 152/222; 152/225 R; 152/239; 152/245
[58] Field of Search .................... 152/213 A, 222, 223, 152/224, 225, 225 R, 231, 232, 243, 245, 221, 226, 239

[56] References Cited

U.S. PATENT DOCUMENTS

| | | | |
|---|---|---|---|
| 1,412,344 | 4/1922 | Devlin | 152/245 |
| 2,178,041 | 10/1939 | Hodell | 152/245 |
| 2,414,067 | 1/1947 | Sentivany | 152/245 |
| 2,728,371 | 12/1955 | McCarthy | 152/243 |
| 3,025,901 | 3/1962 | Bengert | 152/239 |
| 4,275,781 | 6/1981 | Riedel | 152/223 |
| 4,366,850 | 1/1983 | Coutts | 152/243 |
| 4,830,078 | 5/1989 | Chang | 152/231 |

Primary Examiner—Michael W. Ball
Assistant Examiner—Gregory J. Wilber
Attorney, Agent, or Firm—Fleit, Jacobson, Cohn, Price, Holman & Stern

[57] ABSTRACT

A detachable automobile tire nonskid device includes a plurality of members mounted on a metallic portion which would otherwise come in contact with a road surface. The plurality of members may include spaced rigid nonskid plate members and annular elastic bodies alternately disposed on the metallic portion, with the annular bodies having outer diameters greater than a thickness of the nonskid members. The annular elastic bodies also may be supported on flanged spool members alternately mounted on the metallic portion between the nonskid plate members.

10 Claims, 3 Drawing Sheets

NONSKID DEVICE FOR AUTOMOBILE TIRES HAVING ANNULAR ELASTIC BUFFER MEMBERS

This application is a continuation-in-part of application Ser. No. 07/265,801, filed as PCT JP88/00102 on Feb. 4, 1988, published as WO88/06105 on Aug. 25, 1988 now abandoned.

TECHNICAL FIELD

The present invention relates to a slip-preventing device releasably wound around the circumference of an automobile tire for preventing slip of the tire over a road, and especially relates to a slip-preventing device including elastic buffer members annexed to a metallic portion thereof so that the elastic buffer members make initial contact with a road surface.

BACKGROUND ART

In order to prevent slippage of automobile tires on a road, e.g., snow road, various slip-preventing devices have been provided. Typically, there has been provided a well known slip-preventing device 10 as shown in FIG. 4 which includes two long-length parallel chains 13, 14 having end hooks 11, 12, and short-length chains 16 arranged between said long-length chains 13, 14 in a ladder configuration with engagements of end hooks 15 to the long-length chains. The long-length chains 13, 14 of the conventional slip-preventing device 10 are expanded on both sides of an automobile wheel or tire 17 along the circumference of the tire as shown in FIG. 5 so that the short-length chains 16 abut on a road-contacting surface of the wheel or tire 17; thereafter by a fastening of the hooks 11, 12 and an installation of a certain biasing means (not shown), an attaching operation of the slip-preventing device 10 to the tire is completed. Then, it can be used in driving on a snow road, etc., for preventing slippage of tires over snow, a frozen road, etc.

However, in the aforementioned conventional slip-preventing device, tires and road surfaces are frequently injured by high speed rotations of tires in automobile driving because the slip-preventing device is made of a metallic material. In turn, the slip-preventing device is worn away by frictions to the road surface. Therefore comfortable automobile driving is harmed and noises are occured from the slip-preventing device. Further, chains of the conventional slip-preventing device are apt to tangle each other, so that installation of the slip-preventing device would be difficult.

Therefore, it is an object of the present invention to provide a slip-preventing device which has no defect as afore-mentioned of the conventional type, effecting less injuries of tires and road surface, and comfortable drivings.

DISCLOSURE OF INVENTION

Thus the present invention provides elastic buffer members annexed to a slip-preventing device at least at a metallic portion thereof, wherein the elastic buffer members make initial contact with a road surface. Accordingly, injuries of tire and road surface may be eliminated and driving noises may be refrained. It also may afford more comfortable driving.

More specifically, the present invention provides one or more longitudinal elastic buffer members wound around a metallic portion which contacts with road surface, or a plurality of annular elastic buffer members attached to a metallic portion of the device with a certain distance to an adjacent member. When it is operated in a position installed on an automobile or other vehicle tire in certain embodiments of the invention, the buffer member comes first in contact with road surface so that impacts are relieved; thereafter the metallic portion comes in contact with the road surface; with which the problems of the aforementioned conventional devices are solved. Even if the buffer member is worn away by use of long duration, it can be easily replaced with a new one. The buffer member may be applied to various slip-preventing devices other than the illustrated embodiments.

MOST PREFERRED FORMS FOR EMBODYING THE INVENTION

Figure 1:
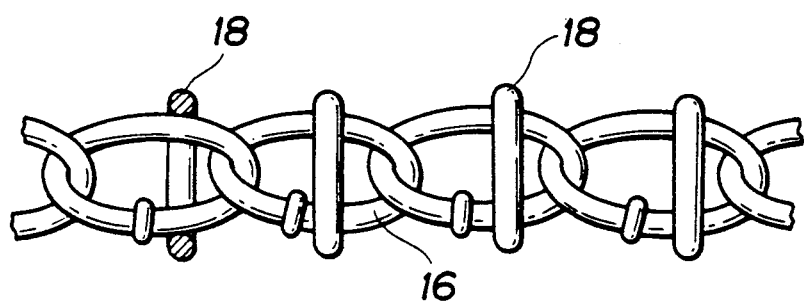
FIG. 1 is a partially broken enlargement of one embodiment according to the present invention.
Figure 2:
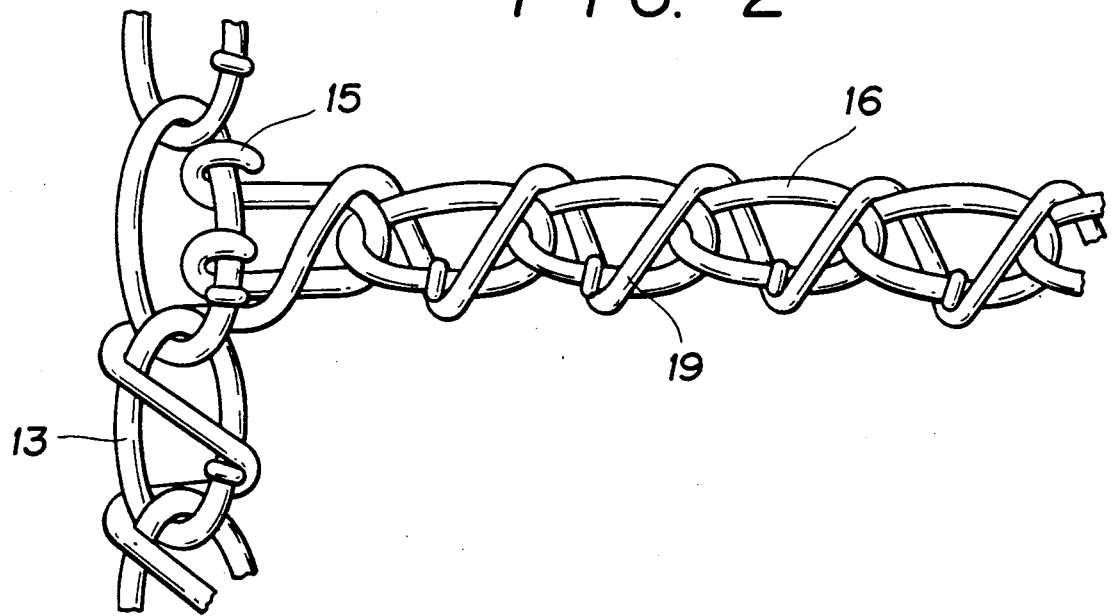
FIG. 2 is a partially broken enlargement of an another embodiment according to the present invention.

Embodiments of the present invention are illustrated with references to the accompanying drawings as follows. FIG. 1 is showing the first embodiment which includes a plurality of annular elastic bodies 18 as buffer members annexed on appropriate locations holding a certain distance from each other around short-length chains 16 of a slip-preventing device which is the same as the conventional one. Said annular elastic body 18 is formed into an annular configuration as an O-ring from buffer or resilient plastic. Said short-length chain 16 is released from said long-length chains 13, 14 by disengagement of hooks 15; thereafter, said annular elastic bodies 18 in an expanded configuration are installed on said short-length chains 16. FIG. 2 is showing the second embodiment which includes an elongated helical elastic body 19 as buffer members, which is annexed to short-length chains 16 of a slip-preventing device which is the same as the conventional one. Said helical elastic body 19 is formed from a material which is the same as the aforementioned annular elastic body 18, whereas said helical elastic body 19 can be wound around short-length chains without disengagement of the hooks 15. The end portion of said helical elastic body 19 may be wound to the long-length chains 13, 14 as illustrated in the drawings.

Figure 3:
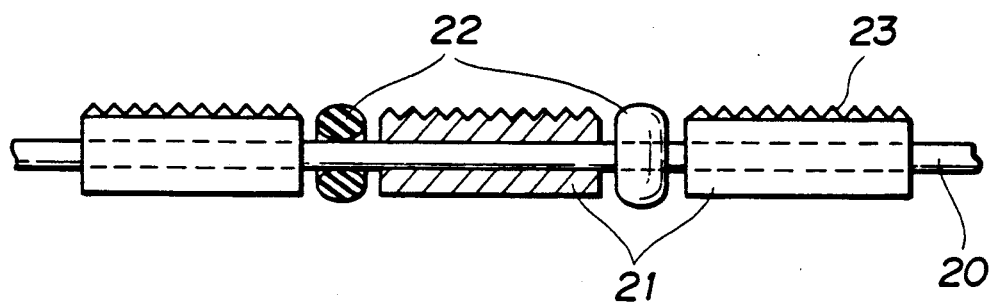
FIG. 3 is a partially sectional broken enlargement of a further embodiment according to the present invention.
Figure 4:
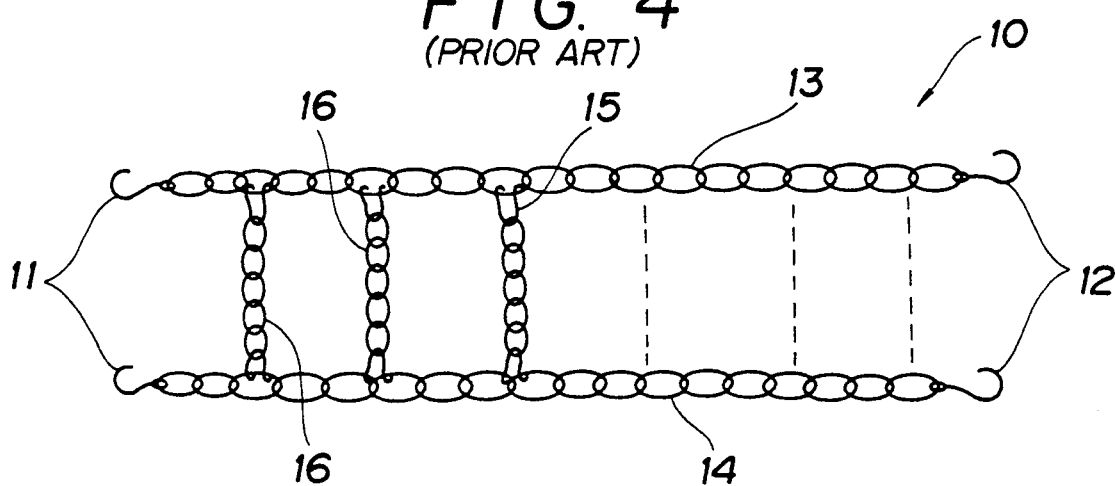
FIG. 4 is a plan view of a conventional slip-preventing device.
Figure 5:
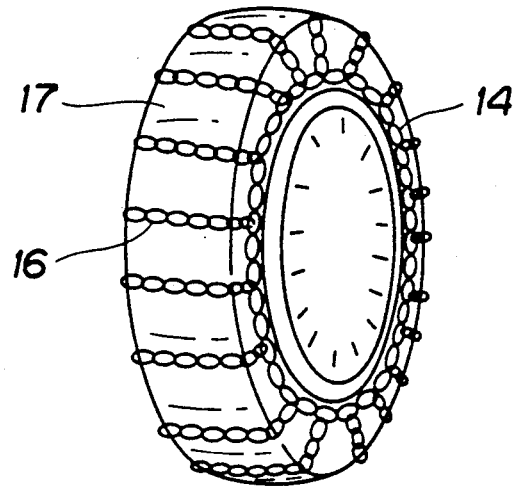
FIG. 5 is a perspective view showing a use of a conventional slip-preventing device.

FIG. 3 is showing the third embodiment of a slip-preventing device wherein metallic wires 20 are provided as one part of respective assemblies which corresponding to said short-length chains 16. Nonskid plates 21 having indentations 23 on a surface contacting with a road surface, and made of steel or other like rigid metal, but in some cases may be preferably a hard rigid plastic, etc., are passed on said metallic wires 20 so that a portion of the slip-preventing device which is in contact with a road surface is composed. Annular elastic bodies 22 which, as is clearly shown in FIG. 3, have diameters essentially corresponding to a thickness of the nonskid plates 21, are alternately disposed on said metallic wires 20 between adjacent ones of the nonskid plates 21 as buffer members.

Thus, at high speed travel, the annular elastic bodies 22 inherently are deformed so that they project outwardly with respect to the plates 21 in radial directions as a result of the operation of centrifugal force. Therefore, as the tire comes into contact with the road surface, the outwardly projected elastic bodies 22 strike the road surface before the plates 21 engage the road surface, so that impacts or sharp blows caused by the plates striking against the road surface are effectively buffered by the elastic bodies. As a result, the plates 21 and the road surface are effectively protected from breakage by what could otherwise be crushing impacts, and road noise is reduced.

Further, the tire contacts the road surface, the rigid plates 21 sustain a thrust load between the tire and the road surface so that slippage of the tire over the road is effectively prevented and the annular elastic bodies 22 are effectively protected from breakage by the thrust load. The rigid plates 21 and the annular elastic bodies 22 thus act as protectors for each other in respective different phases of travel. In this regard, the annular elastic bodies 22, being made of an elastic material, inherently have high strength resistance to the sharp impact loads, but tend to be relatively weak in resistance to the thrust load, whereas the rigid nonskid plates 21, being made of metal or hard plastic, inherently have high strength resistance to the thrust load, but tend to be relatively weak in resistance to the sharp impact loads. In addition, tangling and resultant breakage can be effectively prevented because the members 21, 22, which are passed onto the metallic wire 20, as noted above, readily can be made rotatable thereon.

Figure 6:
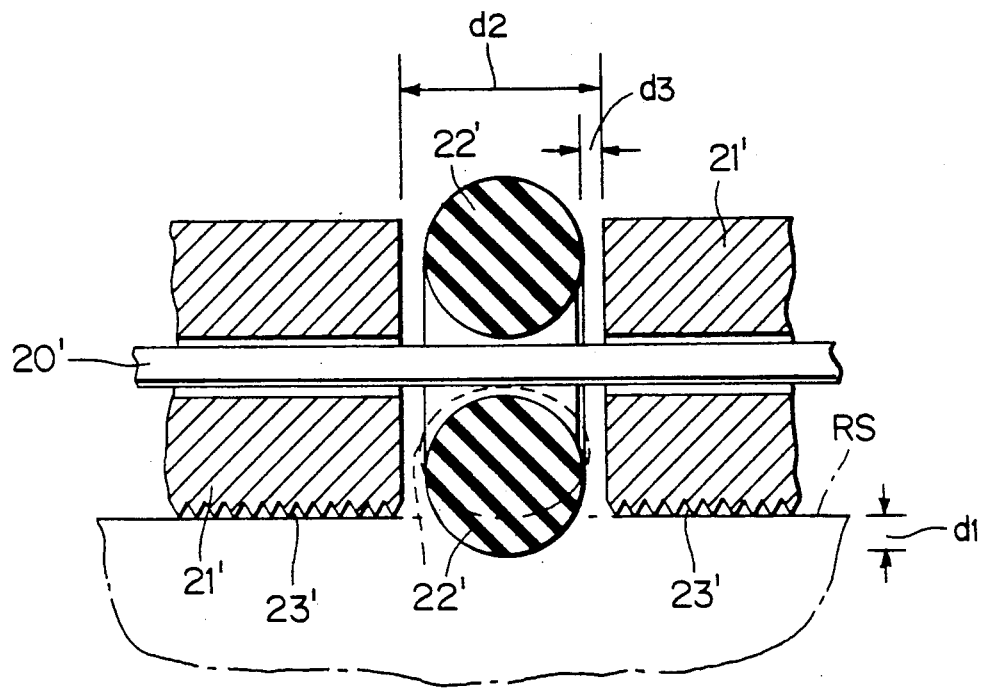
FIG. 6 is a partially sectional broken enlargement of an embodiment according to the present invention, similar to the embodiment shown in FIG. 3.

FIG. 6 discloses a modification of the embodiment of the invention shown in FIG. 3 in which an outer diameter of each of a plurality of annular elastic bodies 22' (only one shown), each of which is mounted on a wire 20', is greater than a thickness of a pair of associated nonskid plate members 21' also mounted on the wire, so that an outermost surface of the annular elastic body projects outward beyond road-gripping indentations 23' on the outermost surfaces of the nonskid plate members. More specifically, as is shown in FIG. 6, when each of the annular elastic bodies 22' is in a free-position, that is, not engaged with a road surface RS (shown in phantom), the annular elastic body is in an expanded condition in which its outermost surface projects beyond the indentations 23' on the outermost surfaces of the nonskid plate members 21' by a distance $d_1$ which permits collapsing of the annular elastic body radially inward relative to the nonskid members. In addition, a thickness dimension of each of the annular elastic bodies 22', as measured in a lateral or transverse direction (horizontal, as viewed in FIG. 6), and the dimensions and/or spacing of the nonskid plate members 21' in the same direction, are such that, when the annular elastic body is essentially centered between the nonskid plate members, as illustrated in FIG. 6, the thickness dimension of the annular elastic body is less than a distance $d_2$ between the nonskid plate members. Thus, distances $d_3$ are defined into which the annular elastic body 22' can expand laterally upon engagement with the road surface RS, as illustrated in phantom in FIG. 6.

In this regard, each of the nonskid plates 21' and/or the annular elastic bodies 22' may have an internal diameter slightly larger than a diameter of the metallic wire 20', so as to be loosely mounted on the wire, as illustrated in FIG. 6, or an internal diameter essentially corresponding to the diameter of the metallic wire, as shown in FIG. 3. In either instance, while the annular elastic bodies 22' may not always be centered between the nonskid plate members 21' at any particular moment in time, the mode of operation of the annular elastic bodies as they collapse upon engaging the road surface RS remains essentially the same. For example, where the nonskid plates 21' and the annular elastic bodies 22' are loosely mounted on the wire 20', since the elastic bodies engage the road surface RS first, they will tend to expand laterally and push the nonskid plates longitudinally along the wire, as necessary.

Figure 7:
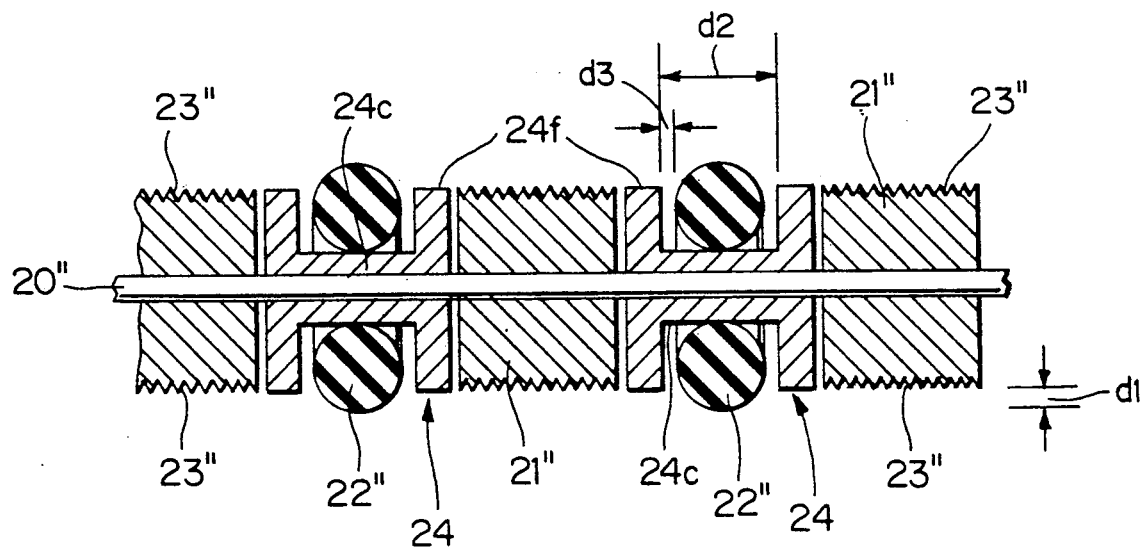
FIG. 7 is a partially sectional broken enlargement of an embodiment according to the present invention, similar to the embodiment shown in FIGS. 3 and 6.

FIG. 7 discloses an embodiment of the invention which is similar to the embodiments of the invention shown in FIGS. 3 and 6, wherein each of a plurality of annular elastic bodies 22" is mounted on an associated spool-type holder 24 which is of an essentially H-shaped construction and which also preferably is formed of steel or other like metal, but in some cases may be a hard plastic. Each of the spool-type holders 24 includes a central cylindrical mounting portion 24c supported (rotatably or nonrotatably, as desired) on a metallic wire 20", and has a pair of circumferentially extending cylindrical flanges 24f integrally formed with the cylindrical portion at its opposite ends. Each of the spool-type holders 24 is mounted on the metallic wire 20" between nonskid members 21" of metal or hard plastic, which also are mounted (rotatably or nonrotatably) on the wire, and which may be plate members, as shown in FIGS. 3 and 6, or may have a different type of cross-section, such as hexagonal or square. The entire periphery of each nonskid member 21" may be provided with road-gripping indentations 23", as illustrated in FIG. 7.

Each of the annular elastic bodies 22" has an outer diameter of a dimension such that an outer portion of the body extends radially outward with respect to the peripheries of the spool-type holder flanges 24f and, as in the embodiment of the invention shown in FIG. 6, radially outward with respect to the road-gripping indentations 23" on outermost surfaces of the nonskid members 21", by a distance $d_1$. Similarly, a thickness dimension of each of the annular elastic bodies is such that, as measured in a lateral or transverse direction (horizontal, as viewed in FIG. 7), the thickness dimension of the body is less than a distance $d_2$ between the associated spool-type holder flanges 24f, to provide distances $d_3$ on opposite sides of the body into which portions of the body can expand when the body is compressed by engagement with a road surface (not shown). In this regard, while the annular elastic bodies may be loosely mounted on the spool holders 24, they preferably are stretch-mounted thereon under tension centrally between the respective spool holder flanges 24f.

The embodiment of FIG. 7 is advantageous in that each spool-type holder 24 prevents direct contact of the annular elastic body 22" supported thereon, with the metallic wire 20" and the adjacent nonskid members 21". Accordingly, injury or damage of the annular elastic body 22" by the metallic wire 20" and/or the nonskid members 21", particularly during high speed travel, is effectively prevented, thereby enhancing the operation and the operating life of the associated slip-preventing device.

POSSIBILITY OF USE IN INDUSTRY

Thus, the slip-preventing device for automobile tire according to a the present invention includes elastic buffer members annexed to metallic portion thereof, so that defects of the conventional devices are solved without decrease of road gripping force by the slip-preventing device.

I claim:

1. A slip-preventing device adapted to be releasably wound around the circumference of a vehicle tire, comprising a plurality of members mounted on a metallic portion of the slip-preventing device which would otherwise come in contact with a road surface, said plurality of members including rigid nonskid members and spool members alternately disposed on said metallic portion, and further including annular elastic bodies supported on said spool members, with said annular elastic bodies being buffer members and having outer diameters greater than a thickness of said nonskid members so as to project radially outward with respect to said nonskid members.

2. The slip-preventing device as defined in claim 1 wherein said nonskid members are made of metal and indentations are formed on a surface of each of said nonskid members which comes in contact with the road surface.

3. The slip-preventing device as defined in claim 1 wherein said nonskid members are made of hard plastic and indentations are formed on a surface of each of said nonskid members which comes in contact with the road surface.

4. The slip-preventing device as defined in claim 1 wherein said nonskid members are plate members.

5. The slip-preventing device as defined in claim 1 wherein said spool members are formed of metal.

6. The slip-preventing device as defined in claim 1 wherein said spool members are formed of hard plastic.

7. The slip-preventing device as defined in claim 1 wherein said annular elastic buffer members are stretch-mounted on said spool members.

8. The slip-preventing device as defined in claim 1 wherein each of said spool members includes a cylindrical supporting portion having circumferentially extending flanges on opposite ends thereof which define a space between said flanges, and the respective annular elastic buffer member supported on said spool member has a thickness dimension which is less than the space between said flanges, at least when said annular elastic buffer is in an expanded condition, to permit lateral expansion of said annular elastic buffer member when said annular elastic buffer member is compressed by engagement with the road surface.

9. The slip-preventing device as defined in claim 8, wherein said spool members are formed of metal and said annular elastic buffer members are stretched-mounted centrally on said spool members.

10. The slip-preventing device as defined in claim 8, wherein said spool members are formed of hard plastic and said annular elastic buffer members are stretched-mounted centrally on said spool members.

* * * * *